US007821323B2

(12) United States Patent
Simi

(10) Patent No.: US 7,821,323 B2
(45) Date of Patent: Oct. 26, 2010

(54) BIAS CIRCUIT FOR A SWITCHING POWER SUPPLY

(75) Inventor: Victor M. Simi, Lexington, KY (US)

(73) Assignee: OSRAM SYLVANIA Inc., Danvers, MA (US)

(*) Notice: Subject to any disclaimer, the term of this patent is extended or adjusted under 35 U.S.C. 154(b) by 197 days.

(21) Appl. No.: 12/291,074

(22) Filed: Nov. 6, 2008

(65) Prior Publication Data

US 2010/0109754 A1    May 6, 2010

(51) Int. Cl.
*G05F 3/02* (2006.01)
(52) U.S. Cl. ........................................ 327/531
(58) Field of Classification Search ............. 327/531, 327/530, 547, 587, 588; 363/15
See application file for complete search history.

(56) References Cited

U.S. PATENT DOCUMENTS

| 6,404,268 | B1 * | 6/2002 | Hung et al. | 327/531 |
| 7,078,937 | B2 * | 7/2006 | Baude et al. | 326/112 |
| 7,256,638 | B2 * | 8/2007 | Vice | 327/531 |

* cited by examiner

*Primary Examiner*—Hai L Nguyen
(74) *Attorney, Agent, or Firm*—Shaun P. Montana

(57) ABSTRACT

A bias circuit for a switching power supply includes a rectifier that is connected to an AC power source and outputs a full wave rectified voltage Vs; a voltage divider, a diode, a first transistor, and a second transistor connected in parallel between Vs and ground; a capacitor connected between a first terminal of the second transistor and ground; and a node between the capacitor and the first terminal of the second transistor providing an output bias voltage Vcc from the bias circuit. A voltage from the voltage divider is provided to a gate of the first transistor, and the diode and a first terminal of the first transistor are connected to a gate of the second transistor.

4 Claims, 2 Drawing Sheets

BIAS CIRCUIT FOR A SWITCHING POWER SUPPLY

BACKGROUND OF THE INVENTION

The present invention is directed to circuit that provides a bias voltage to a switching power supply. Devices such as computers, lamp ballasts, battery chargers, and displays use a switching power supply. Various types of switching power supplies are available, but each needs a bias voltage to power the control circuit. The bias voltage, typically 12 volts at 10-100 ma, is derived from an input power source, which may be a main at 120 or 220-240 volts, 50-60 hertz.

The presently available bias circuits can be improved by reducing their size, cost and power consumption.

SUMMARY OF THE INVENTION

An object of the present invention is to provide a novel bias circuit for a switching power supply that is smaller in size, cost and power consumption than prior art circuits.

A further object of the present invention is to provide a novel a bias circuit for a switching power supply that includes a rectifier that is connected to an AC power source and outputs a full wave rectified voltage Vs; a voltage divider, a diode, a first transistor, and a second transistor connected in parallel between Vs and ground; a capacitor connected between a first terminal of the second transistor and ground; and a node between the capacitor and the first terminal of the second transistor providing an output bias voltage Vcc from the bias circuit, where a voltage from the voltage divider is provided to a gate of the first transistor, and the diode and a first terminal of the first transistor are connected to a gate of the second transistor.

These and other objects and advantages of the invention will be apparent to those of skill in the art of the present invention after consideration of the following drawings and description of preferred embodiments.

DESCRIPTION OF PREFERRED EMBODIMENTS

Figure 1:
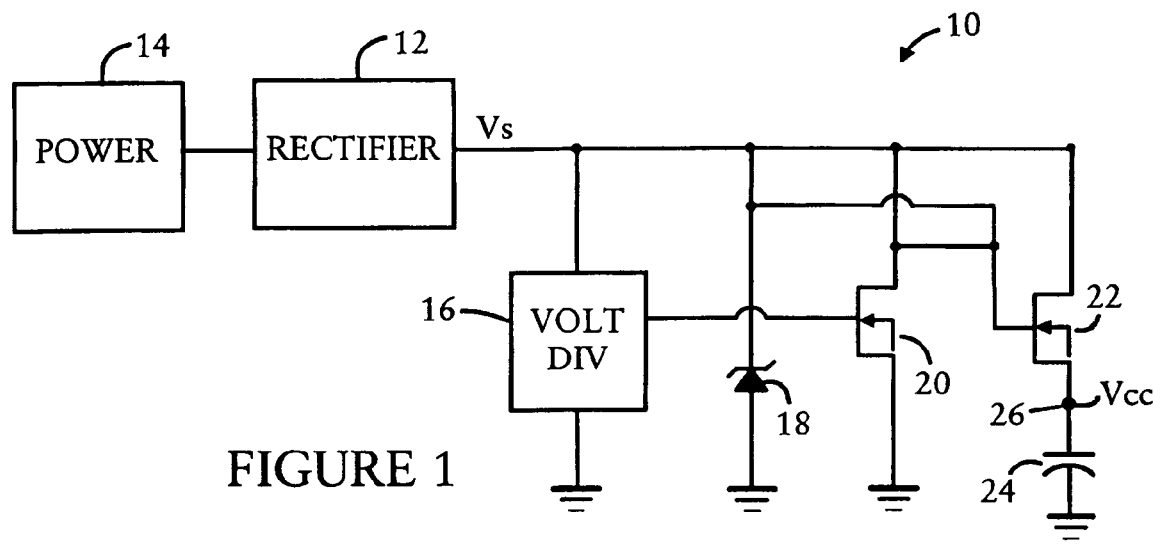
FIG. 1 is a schematic diagram of a circuit of the present invention.

With reference now to FIG. 1, a bias circuit 10 of the present invention includes a rectifier 12 that is connected to an AC power source 14 and outputs a full wave rectified voltage Vs. A voltage divider 16, a diode 18, a first transistor 20, and a second transistor 22 are connected in parallel between Vs and ground. A voltage from the voltage divider 16 is provided to a gate of the first transistor 20, and the diode 18 and a first terminal of the first transistor 20 are connected to a gate of the second transistor 22. A capacitor 24 is connected between a first terminal of the second transistor 22 and ground, and a node 26 between the capacitor 24 and the first terminal of the second transistor 22 provides an output bias voltage Vcc from the bias circuit 10.

Operation begins with the capacitor 24 in a discharged state. When the input voltage rises, current flows to the gate of the second transistor 22 charging the gate-to-source capacitance of the second transistor 22. Once the gate-to-source voltage exceeds the threshold voltage (e.g., 4-5 volts), current begins to flow through the second transistor 22 and charges the capacitor 24. Once the capacitor 22 charges to the required voltage (e.g., 12 volts), the output is established, although it may take several cycles to reach equilibrium depending on the load condition and circuit parameters.

The switching action of the first transistor 20 keeps circuit power dissipation low. Once Vs reaches Voff for the first transistor 20, the first transistor 20 turns ON, which in turn drops the voltage the gate of the second transistor 22 to zero. The net result is that the capacitor 24 charges only when the input voltage is low, which reduces the power dissipated by the second transistor 22.

Figure 2:
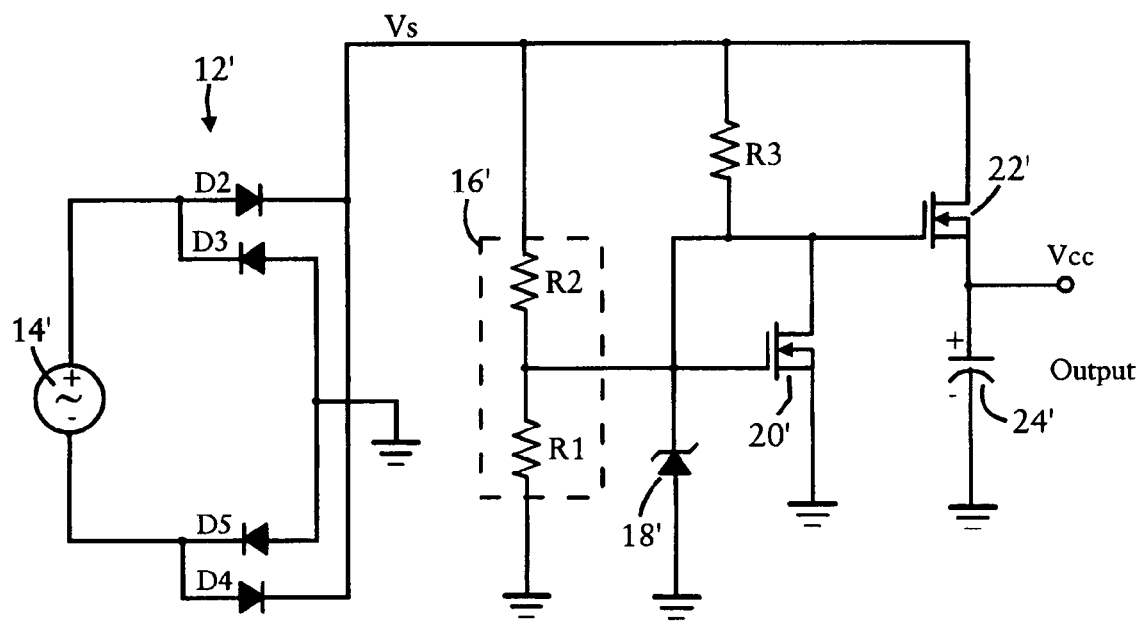
FIG. 2 is a circuit diagram of an embodiment of the circuit of FIG. 1.
Figure 3:
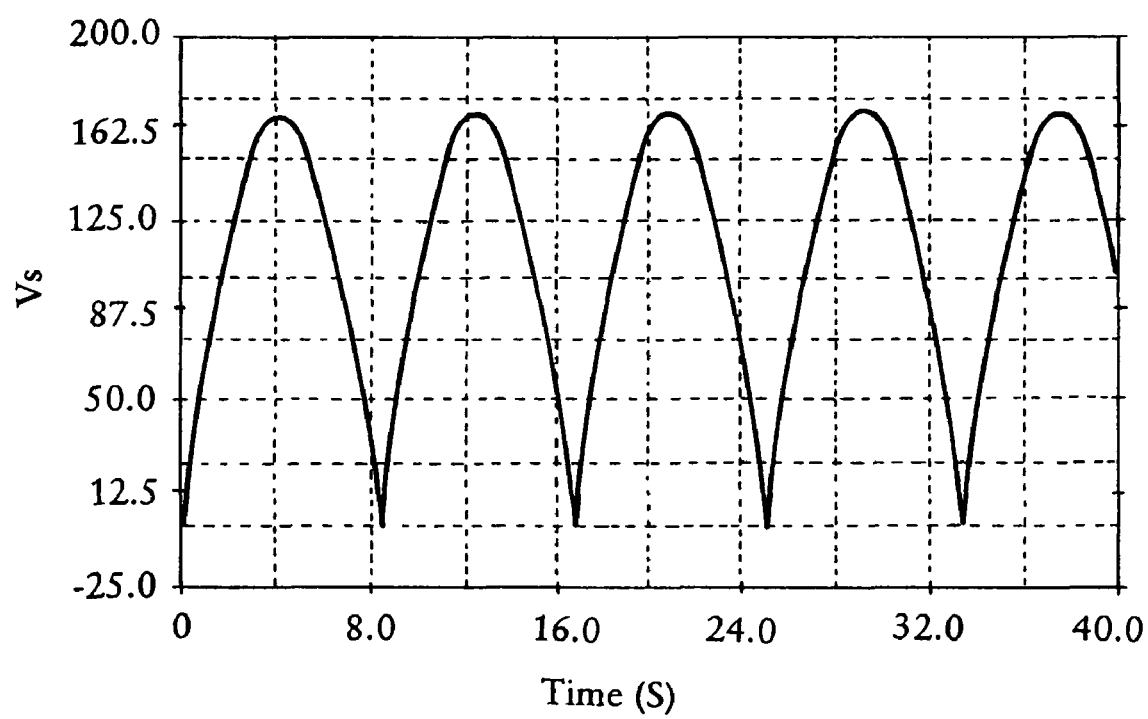
FIG. 3 is chart showing the voltage Vs provided from the rectifier of FIG. 1.

A more particular embodiment of the present invention is shown in FIG. 2. The rectifier 12' includes respective pairs of diodes D2-D5 that provide the full wave rectified output Vs shown in FIG. 3. The voltage divider 16' includes a pair of resistors R1, R2 where the ratio of R1 to R2 sets the voltage Voff, also shown in FIG. 3. The first and second transistors 20' and 22' may be N-channel enhancement mode MOSFETs. The diode 18' and the first transistor 20' may be connected to Vs through a further resistor R3. Voff may be established by Equation 1.

$$V_{off} = V_{th1}(R1+R2)/R1, \quad (1)$$

where $V_{th1}$ is the threshold voltage of the first transistor 20'.

The output voltage Vcc has a ripple proportional to the current being supplied to the control circuit of the switching power supply. The peak value is given by Equation 2. The value of the capacitor 24' is determined by the output ripple specification and load current, and Equation 3 shows this relationship.

$$V_{cc} = V_z - V_{th2}, \quad (2)$$

where $V_{th2}$ is the threshold voltage of the second transistor 22'.

$$C = I_o(\Delta t / \Delta V_o), \quad (3)$$

where $\Delta t$ is the time interval when the second transistor is OFF, Io is the average load current, and $\Delta V_o$ is the desired ripple.

As described above, the circuit of the present invention provides a bias voltage for the control of a switching power supply. The circuit does not need a transformer or power-wasting resistors to drop the voltage, and is a voltage controlled switching regulator without magnetic components. Since the power dissipation is low, small and inexpensive components can be used, thereby reducing both the size and the cost of the circuit. It is adaptable to almost any switching power supply and with knowledgeable selection of components, can be used with a 120, 220-240 volt 50-60 Hz applications. It also is usable with products that operate from dimmers, such as lamps.

While embodiments of the present invention have been described in the foregoing specification and drawings, it is to be understood that the present invention is defined by the following claims when read in light of the specification and drawings.

I claim:

1. A bias circuit for a switching power supply, comprising:
   a rectifier that is connected to an AC power source and outputs a full wave rectified voltage Vs;
   a voltage divider, a diode, a first transistor, and a second transistor connected in parallel between Vs and a ground, wherein a voltage from the voltage divider is provided to a gate of the first transistor, and wherein the diode and a first terminal of the first transistor are connected to a gate of the second transistor;

a capacitor connected between a first terminal of the second transistor and the ground; and a node between the capacitor and the first terminal of the second transistor providing an output bias voltage Vcc from the bias circuit.

2. The circuit of claim 1, wherein the voltage divider comprises two resistors connected in series.

3. The circuit of claim 1, further comprising a resistor connecting both the diode and the first terminal of the first transistor to Vs.

4. A bias circuit for a switching power supply, comprising:

a rectifier that is connected to an AC power source and outputs a full wave rectified voltage Vs;

a voltage divider connected between Vs and a ground;

a diode having a first terminal connected to Vs and a second terminal connected to the ground;

a first transistor having a first terminal connected to Vs and a second terminal connected to the ground;

a second transistor having a first terminal connected to Vs and a second terminal connected to a node, wherein a divided voltage from the voltage divider is provided to a gate of the first transistor, and wherein the first terminal of the diode and the first terminal of the first transistor are connected to a gate of the second transistor; and a capacitor connected between the node and the ground, the node outputting a voltage Vcc from the bias circuit.

* * * * *